United States Patent [19]

Engler et al.

[11] Patent Number: 5,200,945
[45] Date of Patent: Apr. 6, 1993

[54] OPTICAL DATA STORAGE SYSTEM WITH AIRFLOW DEFECTING MEMBER

[75] Inventors: Edward M. Engler, San Jose; Stephen L. Heesacker, Sunnyvale; David A. Holmstrom; Byron S. Lee, both of San Jose, all of Calif.

[73] Assignee: International Business Machines Corporation, Armonk, N.Y.

[21] Appl. No.: 817,720

[22] Filed: Jan. 7, 1992

[51] Int. Cl.⁵ .............................................. G11B 33/02
[52] U.S. Cl. .................................... 369/99; 369/75.1; 360/97.02
[58] Field of Search ........................ 369/99, 100, 75.1; 360/97.02

[56] References Cited

U.S. PATENT DOCUMENTS

| | | | |
|---|---|---|---|
| 4,583,213 | 4/1986 | Bracken et al. | 360/97.02 |
| 4,814,906 | 3/1989 | Suzuki et al. | 360/75 |
| 5,086,422 | 2/1992 | Hagiya et al. | 360/97.02 |

FOREIGN PATENT DOCUMENTS

| | | |
|---|---|---|
| WO900657 | 6/1990 | European Pat. Off. |
| 61-239482 | 10/1986 | Japan |
| 62-40641 | 2/1987 | Japan |
| 63-124282 | 5/1988 | Japan |
| 63-269392 | 11/1988 | Japan |
| 1-185840 | 7/1989 | Japan |
| 1-287893 | 11/1989 | Japan |
| 2-14483 | 1/1990 | Japan |
| 2-31339 | 2/1990 | Japan |
| 2-304767 | 2/1990 | Japan |
| 2-105340 | 4/1990 | Japan |
| 2-152028 | 6/1990 | Japan |
| 2-187958 | 7/1990 | Japan |
| 2-58789 | 11/1990 | Japan |
| 2-276056 | 11/1990 | Japan |

OTHER PUBLICATIONS

"Dust-Trapping Lens Shield", IBM Technical Disclosure Bulletin, G. M. Yanker, vol. 33, #10B, Mar. 1991, pp. 484–485.

Primary Examiner—Paul M. Dzierzynski
Assistant Examiner—Kiet T. Nguyen
Attorney, Agent, or Firm—Douglas R. Millett

[57] ABSTRACT

An optical disk drive is located in a housing having a centrally pivoted door. An optical disk cartridge is inserted into the drive and is received by a sealing member. The cartridge and sealing member divides the interior of the drive into two compartments. The first compartment contains the electronics which need to be cooled and the second compartment contains the optical elements. The door and sealing member allow airflow in the first compartment but prevent it from reaching the second compartment. An airfoil is positioned over the optical elements in the second compartment to protect them from airflow developed by the spinning disk.

30 Claims, 10 Drawing Sheets

OPTICAL DATA STORAGE SYSTEM WITH AIRFLOW DEFECTING MEMBER

BACKGROUND OF THE INVENTION

1. Field of the Invention

This invention relates to optical data storage systems, and more particularly to such systems which have removable optical media.

2. Description of the Prior Art

Optical data storage systems such as disk drives use laser beams to record and read data from optical data storage disks. The disks are typically packaged in a cartridge for easy removal from the drive. A problem with these systems is that dust and other particles can collect inside the drive and adhere to the optical elements such as the disk or the objective lens which is used to focus light to the disk. The collection of dust and particles causes a degradation in the signal to noise ratio and can ultimately cause the disk drive to fail.

Various schemes have been proposed to try and solve the contamination problem. The optical disk cartridges have been equipped with shutters to prevent contamination of the disk. See Japanese published applications JP 02-304767, published Dec. 18, 1990, by Horie, et al.; and JP 02-187958, published Jul. 24, 1990, by Kishi, et al. Some drives use filters or particle traps. See Japanese published applications JP 61-239482, published Oct. 24, 1986, by Yabuuchi, et al.; JP 02-276056, published Nov. 9, 1990 by Nakano, et al.; JP 02-58789, published Feb. 27, 1990, by Fujino, et al.; JP 01-185840, published Jul. 25, 1989, by Kimura, et al.; JP 63-124282, published May 27, 1988, by Sasaki, et al.; JP 02-14483, published Jan. 18, 1990, by Osumi, et al.; and IBM Technical Disclosure Bulletin, Vol. 33, No. 10B, March 1991, pp. 484, by Yanker. There are also drives which contain lens cleaners. See Japanese published applications JP 01-287893, published Nov. 20, 1989, by Warisaya, et al.; JP 02-105340, published Apr. 17, 1990, by Sugano, et al.; JP 02-31339, published Feb. 1, 1990, by Miyajima, et al.; JP 62-40641, published Feb. 21, 1987, by Kitazawa, et al.; and JP 02-152028, published Jun. 12, 1990, by Suzuki, et al. PCT application W09006576, published Jun. 14, 1990 by Hake shows the use of a lens cover. U.S. Pat. No. 4,814,906, issued Mar. 21, 1989 to Suzuki, et al.; and Japanese published application JP 63-269392, published Nov. 7, 1988 by Ouguchi, et al. show examples of contamination protection schemes for magnetic disk drives.

What is needed is an optical disk drive system with removable media which inexpensively, compactly, and efficiently solves the particle contamination problem without sacrificing the interior airflow necessary for proper cooling.

SUMMARY OF THE INVENTION

Briefly, in a preferred embodiment, the present invention comprises an optical disk drive for use with removable optical media. The drive has an outer housing which has an entrance aperture for receiving the optical media cartridge. An entrance door is positioned over the entrance aperture. The door rotates along a pivot line proximate the central longitudinal axis of the door. When the cartridge is inserted through the entrance aperture, a first portion of the door rotates outward and a second portion of the door rotates inward. The second portion of the door engages the cartridge when the cartridge is positioned in the optical drive. The door remains open and allows cooling airflow above the cartridge.

The optical cartridge divides the interior of the housing into a first and a second compartment when the cartridge is positioned in the optical drive. A sealing member is located between the housing and the cartridge to minimize airflow between the compartments. The entrance aperture is located in the first compartment and the optical elements of the drive are located in the second compartment.

An airfoil is located on the optical head of the optical disk drive. The airfoil is shaped to divert the centrifugal airflow from the spinning disk away from the objective lens of the optical head. The particle buildup rate is thereby reduced.

For a fuller understanding of the nature and advantages of the present invention, reference should be made to the following detailed description taken into conjunction with the accompany drawings.

DESCRIPTION OF THE PREFERRED EMBODIMENTS

The present invention is related to the copending U.S. patent application entitled "Optical Data Storage System With Reduced Particle Contamination" (Attorney Docket No. SA991092), by the same inventors.

Figure 1:
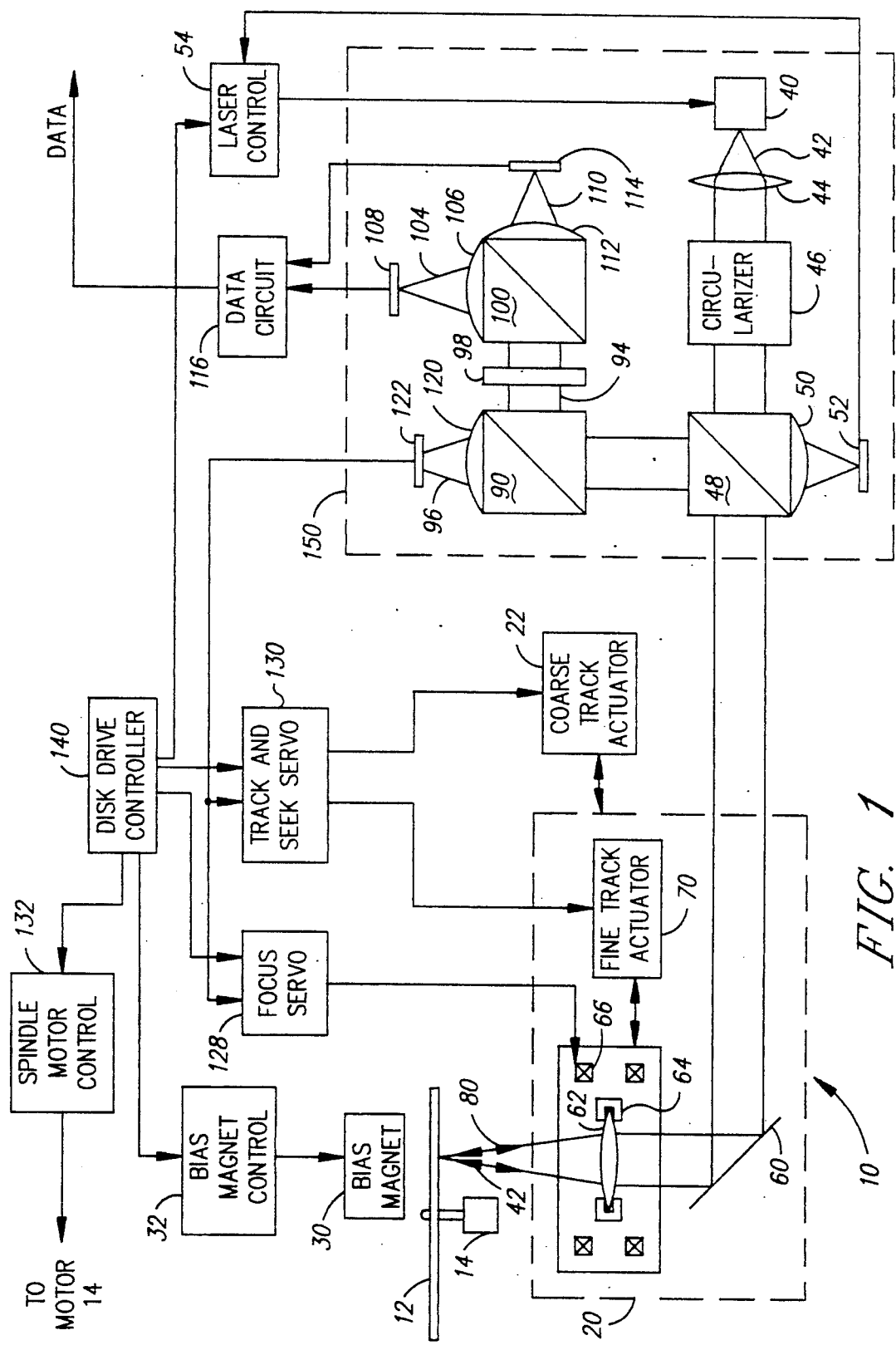
FIG. 1 shows a schematic diagram of the optical disk drive of the present invention.

FIG. 1 is a schematic diagram of an optical data storage system of the present invention and is designated by the general reference number 10. System 10 has an optical data storage medium 12 which is typically a disk having concentric or spiral data tracks. Disk 12 is contained in an optical disk cartridge (not shown). Disk 12 is mounted to a spindle motor 14. An optical head 20 is positioned below disk 12. Head 20 is moved in a radial direction relative to disk 12 by a coarse track actuator 22. A bias magnet 30 is located above disk 12 and is connected to a magnet control 32.

A laser 40 produces a polarized light beam 42. Laser 40 may be a laser diode. One example of such a laser diode is a gallium-aluminum-arsenide laser diode which generates light at approximately 780 nm in wavelength.

Light beam 42 is collimated by a lens 44 and circularized by a circularizer 46. Circularizer 46 is preferably a prism.

Beam 42 passes to a beamsplitter 48. A portion of beam 42 is reflected toward a lens 50. Lens 50 focuses the light to a power monitor optical detector 52. Detector 52 is connected to a laser control 54. Detector 52 provides laser control 54 with a power monitor signal which is used to adjust the power of laser 40 as appropriate.

The remaining portion of beam 42 passes through beamsplitter 48 to a mirror 60. Mirror 60 reflects the light toward an objective lens 62. Lens 62 focuses beam 42 onto the disk 12. Lens 62 is mounted in a lens holder 64. Holder 64 may be moved relative to disk 12 by a focus actuator motor 66. Lens 62 and lens holder 64 are attached to a fine track actuator 70 which moves the lens 62 small distances in a radial direction for purposes of maintaining the light beam 42 on the proper track position on the disk. Mirror 60, lens 62, holder 64, focus actuator 66 and fine track actuator 70 are located on the optical head 20.

A light beam 80 is reflected from the disk 12, passes through lens 62 and is reflected by mirror 60. A portion of the light beam 80 is then reflected by beamsplitter 48 to a beamsplitter 90. Beamsplitter 90 divides the beam 80 into a data beam 94 and a servo beam 96.

Data beam 94 passes through a half waveplate 98 to a polarizing beamsplitter 100. Beamsplitter 100 divides beam 94 into two orthogonal polarization components. A first polarization component beam 104 is focussed by a lens 106 to a data optical detector 108. A second polarization component beam 110 is focussed by a lens 112 to a data optical detector 114. A data circuit 116 is connected to detectors 108 and 114, and generates a data signal responsive to the differences in the amount of light detected at detectors 108 and 114 which is representative of the data recorded on disk 12.

Servo beam 96 is focussed by a lens 120 onto a segmented optical detector 122, such as a spot size measuring detector as is known in the art. A focus servo 128, as is known in the art, is connected to detector 122 and motor 66. Servo 128 controls motor 66 to adjust the position of lens 62 as appropriate in order to maintain proper focus. A track and seek servo 130, as is known in the art, is connected to detector 122 and actuators 22 and 70. Servo 130 causes actuator 22 to adjust the position of head 20 as appropriate to seek desired tracks on disk 12, and causes actuator 70 to move lens 62 as appropriate to maintain proper tracking position once the appropriate track is reached. A spindle motor control 132, as is known in the art, is connected to motor 14. A disk drive controller 140, as is known in the art, provides overall control for servo 128 and 130, as well as spindle motor 14, laser control 54 and magnet control 32.

A fixed optical element (FOE) system 150 comprises laser 40, lens 44, circularizer 46, beamsplitter 48, lens 50, detector 52, beamsplitter 90, waveplate 98, beamsplitter 100, lenses 106, 112, 120 and detectors 108, 114 and 122.

The writing and reading operations of system 10 may now be understood. During the write operation, controller 140 causes laser control 54 to energize laser 40 to provide a high power polarized beam 42. Beam 42 is powerful enough to heat a spot on the disk 12 to a temperature above its Curie temperature. The Curie temperature is the temperature at which the magnetic domain of the heated spot may be magnetically oriented. Controller 140 causes magnet control 32 to energize magnet 30. The magnetic domains of the heated spots are then oriented in the same direction as the magnetic field generated by the bias magnet 30. The laser 40 is pulsed responsive to the data to be recorded on the disk. The result is that data is recorded on the disk as spots having an up or down magnetic orientation.

During a read operation, controller 140 causes laser control 54 to energize laser 40 to generate a low power polarized beam 42 which is not powerful enough to heat the disk 12 above its Curie temperature. The reflected light 80 has its plane of polarization rotated one way or the other depending upon the magnetic domain orientations of the spots on the disk 12. This is known as the Kerr effect. These differences in polarization are detected by detectors 108 and 114, and data circuit 116 outputs a digitized data signal representative of the recorded data.

Figure 2:
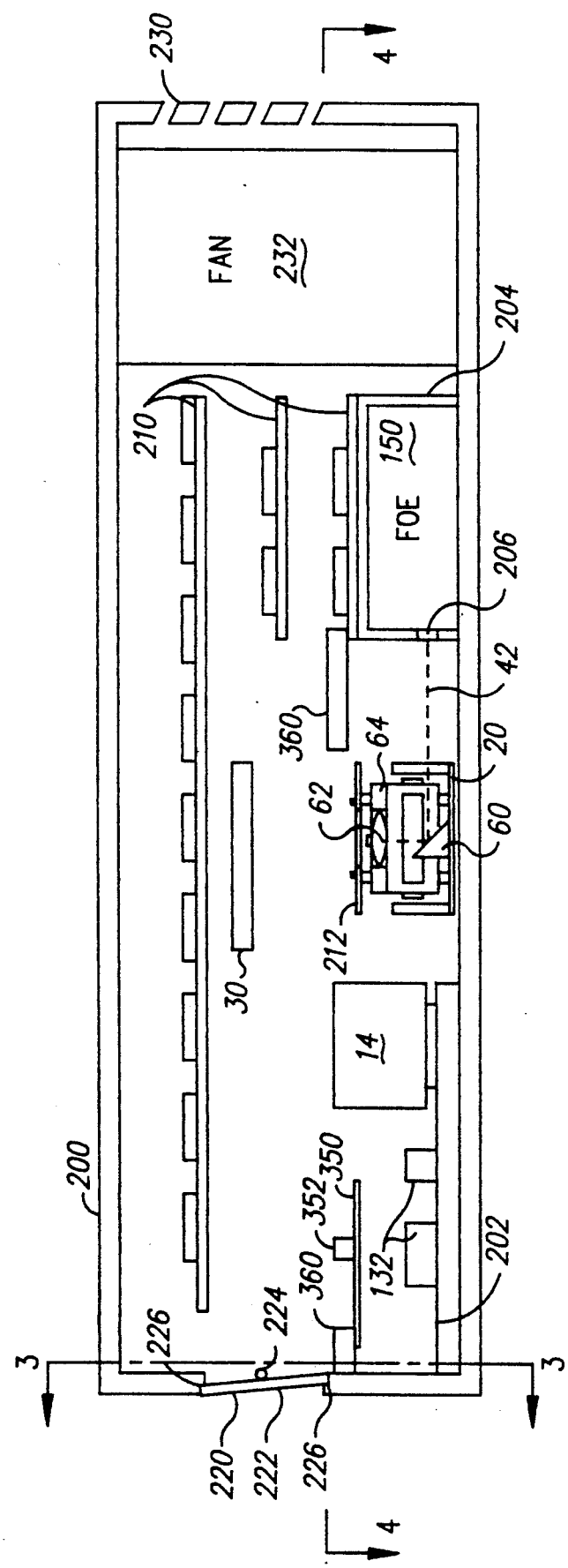
FIG. 2 shows a cross-sectional side view of the drive of FIG. 1.

FIG. 2 shows a cross-sectional side view of the system 10. The system 10 has a housing 200 for enclosing and protecting the components of system 10. The spindle motor 14 and spindle motor control 132 are located on an electronic card 202 attached to the housing 200. The FOE 150 is located in an interior enclosure 204 attached to housing 200. Enclosure 204 contains an aperture 206 which allows beam 42 to pass to the optical head 20. Optical head 20 is located between FOE 150 and spindle motor 14. The electronics of the controller 140, magnet control 32, focus servo 128, track and seek servo 130, data circuit 116 and laser control 54 are distributed among electronic cards 210. Cards 210 and bias magnet 30 are attached to the interior of housing 200. An airfoil 212 is attached to optical head 20 and is described in more detail below.

Housing 200 has an entrance aperture 220 and an entrance door 222. Door 222 completely seals entrance 220 when the door is closed. The door 222 rotates about a pair of pivot axles 224. The housing 200 has flanges 226 located along the entrance aperture 220 for engaging door 222. A plurality of exhaust slots 230 are located within housing 200 on a side opposite to that of entrance aperture 220. A fan 232 is attached to the housing 200 and is located proximate the exhaust slots 230.

Figure 3:
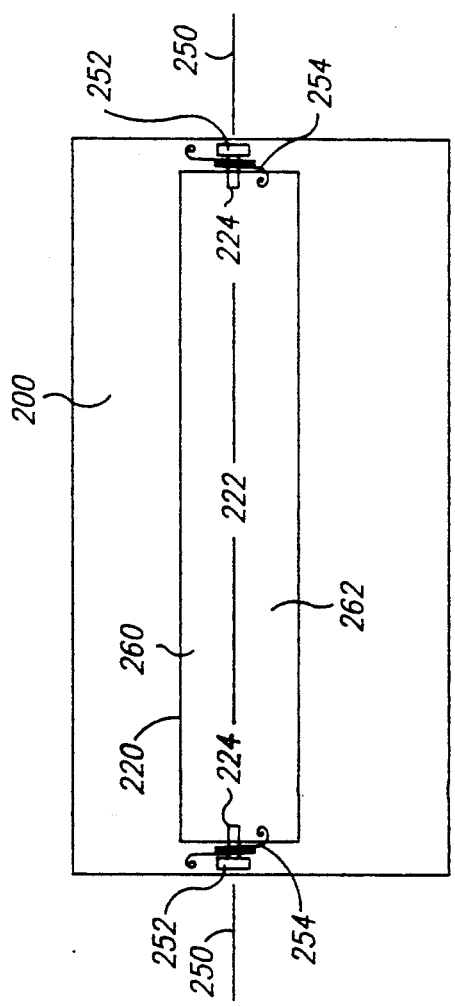
FIG. 3 shows an interior side view of the entrance door.

FIG. 3 shows an interior side view of door 222 taken along line 3—3 of FIG. 2. The axles 224 are attached to door 222 along a pivot line 250. Line 250 is located between the longitudinal edges of the door 222 and is preferably located proximate the central longitudinal axis of door 222. Housing 200 has a pair of journal bearings 252 which receive the axles 224. A pair of springs 254 are positioned along axles 224 between door 222 and bearings 252. The springs 254 force door 222 against ledges 226 such that the door 222 is completely shut. The pivot line 250 divides door 222 into an upper portion 260 and a lower portion 262. When door 222 is opened, portion 260 swings outward and portion 262 swings inward relative to housing 200.

Figure 4:
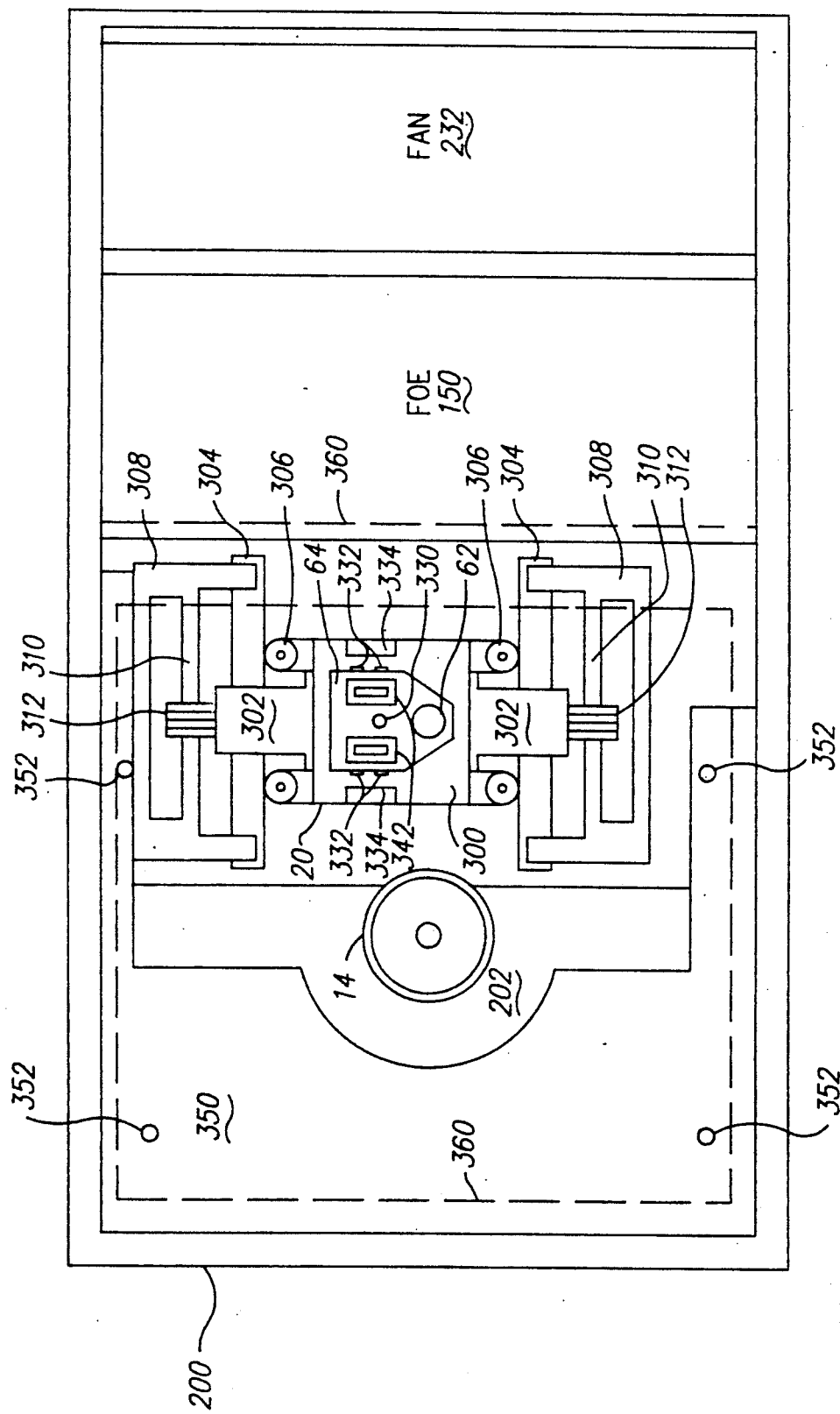
FIG. 4 shows a cross-sectional top view of the drive of FIG. 2.

FIG. 4 shows a cross-sectional top view of sysem 10 taken along line 4—4 of FIG. 2. The arifoil 212 has been removed in order to give a better view of the optical head 20. The optical head 20 includes a carriage 300. Carriage 300 has a pair of journal bearing members 302 which ride along a pair of rails 304. A plurality of rail wheels 306 are rotatably attached to carriage 300 and engage rail 304. Rails 304 are supported by a pair of rail support members 308 which are attached to the interior floor of housing 200. Support members 308 each have a magnet section 310 which receives a coil winding 312.

The coil windings 312 are attached to each end of carriage 300. Magnets 310 and coils 312 comprise the course track actuator 22 which moves carriage 300 and lens 62 in a radial direction relative to spindle motor 14.

Lens holder 64 is pivotally mounted to a central post 330. A plurality of coil windings 332 are located on the sides of holder 64. A pair magnets 334 are attached to carriage 300 and are located proximate the coils 332. Coils 332 and magnets 334 comprise the fine track actuator 70 which causes holder 64 to pivot slightly about post 330. This slight movement is enough to shift lens 62 in a radial direction for purposes of fine tracking.

A pair of magnet posts 340 are attached to carriage 300 and pass through a pair of apertures 342 in holder 64. The apertures 342 are large enough to allow holder 64 to pivot about post 330 without interference occurring at posts 340. A coil winding 344 (shown in FIG. 8) is attached to holder 64 and is positioned around posts 340. Posts 340 and coil 344 comprise the focus actuator 66 which moves holder 64 slightly up or down along post 330 in order to achieve correct focus.

A cartridge ledge 350 is attached to the interior of housing 200 and extends above card 202. Ledge 350 has four cartridge posts 352 which extend above ledge 350 and engage a lower surface of an optical disk cartridge when the cartridge is loaded into system 10.

A sealing member 360 (shown in dotted line) is attached to housing 200 and cartridge ledge 350 and extends around the area above the spindle motor 14 and optical head 20. Sealing member 360 may be made of rubber or other suitable sealing material and is sized to engage the lower surface of an optical disk cartridge.

Figure 5:
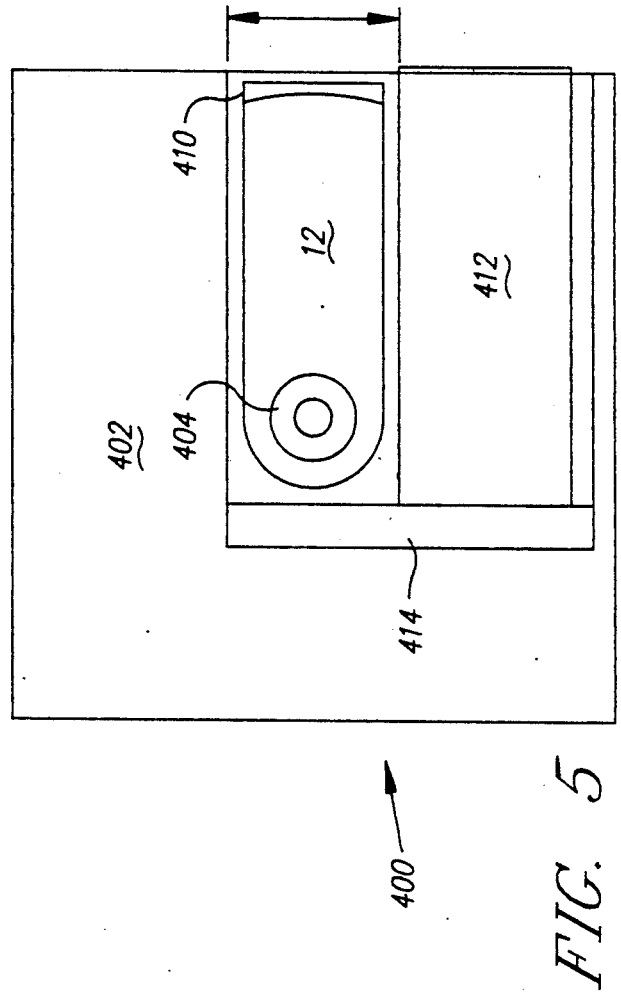
FIG. 5 shows a bottom view of an optical disk cartridge.

FIG. 5 shows a bottom view of an optical disk cartridge which is designated by the general reference number 400. Cartridge 400 has an outer casing 402 which houses the optical disk 12. Disk 12 has a hub 404 shaped to engage the spindle motor 14. Spindle motor 14 has a magnet which engages the metal surface of hub 404. Casing 402 has a slot 410 which allows access to disk 12. A shutter door 412 is slidably mounted in a track 414 which is attached to casing 402. Door 412 slides over slot 410 (as shown by the arrow) to protect disk 12 when it is not in use.

Figure 6:
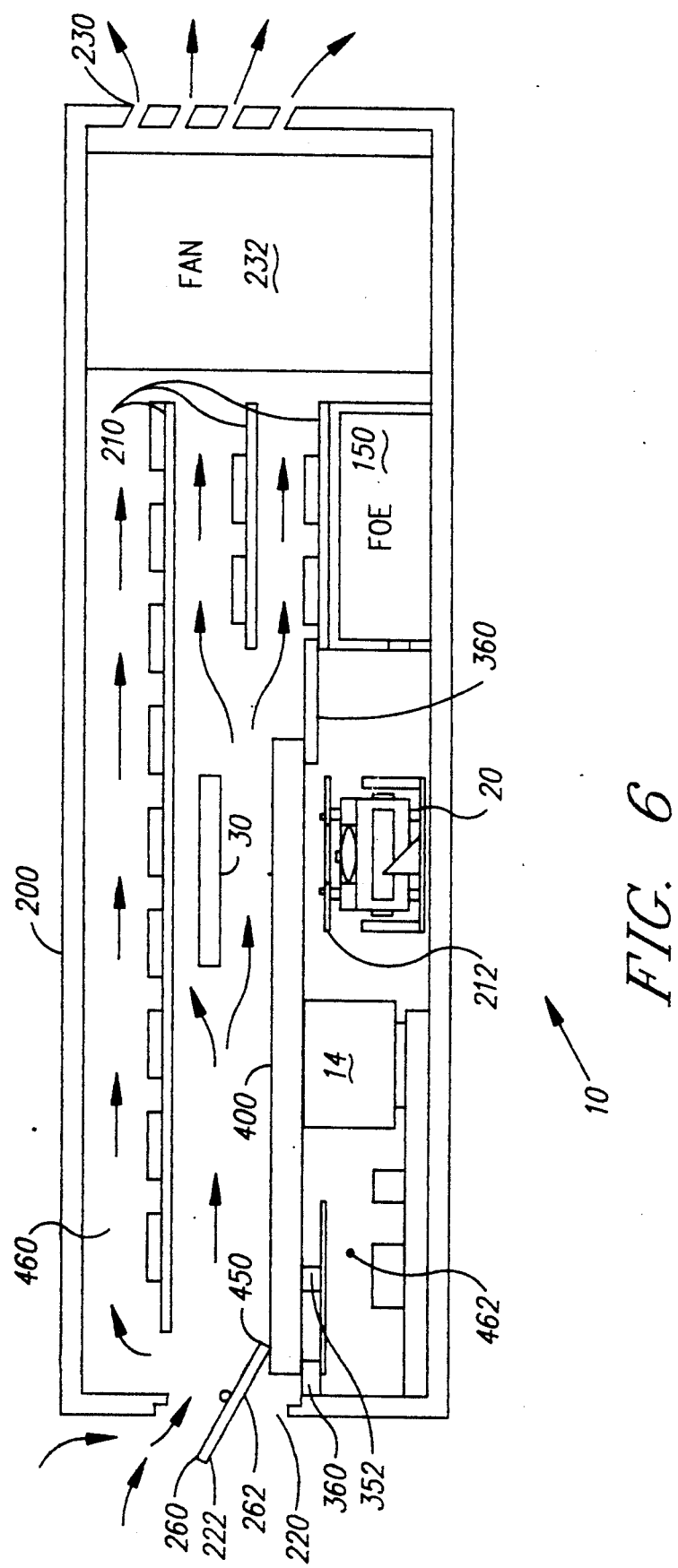
FIG. 6 shows a cross-sectional side view of the drive of FIG. 2 with a removable optical disk cartridge inserted.

FIG. 6 shows a cross-sectional side view of system 10 similar to FIG. 2, except that the system 10 now contains the optical disk cartridge 400. The disk cartridge 400 is inserted through aperture 220. Door 222 rotates to allow the cartridge 400 to be inserted through the lower portion of aperture 220. An edge 450 of door 222 engages the upper surface of cartridge 400. Springs 254 force door 222 in a clockwise direction against the upper surface of cartridge 400. When the cartridge 400 is fully inserted it drops down and hub 404 engages motor 14. A lower surface of cartridge 400 engages posts 352 and sealing member 360. A loading mechanism (not shown) properly positions cartridge 400 and simultaneously opens shutter 412 of the cartridge 400. The loading mechanism is known in the art.

Note that cartridge 400 and sealing member 360 divide the interior of housing 200 into an upper compartment 460 and a lower compartment 462. Upper compartment 460 contains the electronic cards 210 and bias magnet 30 which need the cooling airflow of fan 232. Door 222 allows the upper portion of aperture 222 to remain open so that a good airflow is achieved through the upper compartment 460. The airflow is represented by the arrows. Lower compartment 462 which contains the optical elements of the optical head 20 and FOE 150 is effectively sealed off from the airflow in the upper compartment 460 and the potential for particle contamination is thereby reduced. When the drive is not in use and cartridge 400 is not present, door 222 remains closed to prevent any airflow in housing 200. The optical elements are thereby protected from particle contamination.

Lower compartment 462 is effectively isolated from the airflow caused by fan 232 when the cartridge 400 is inserted. However, shutter 412 of cartridge 400 is open and the spinning disk 12 is exposed to the lower compartment 462. The spinning disk 12 causes a centrifugal airflow near the optical head 20. In order to protect the head 20, and especially the lens 62, from this airflow, system 10 has an airfoil 212.

Figure 7:
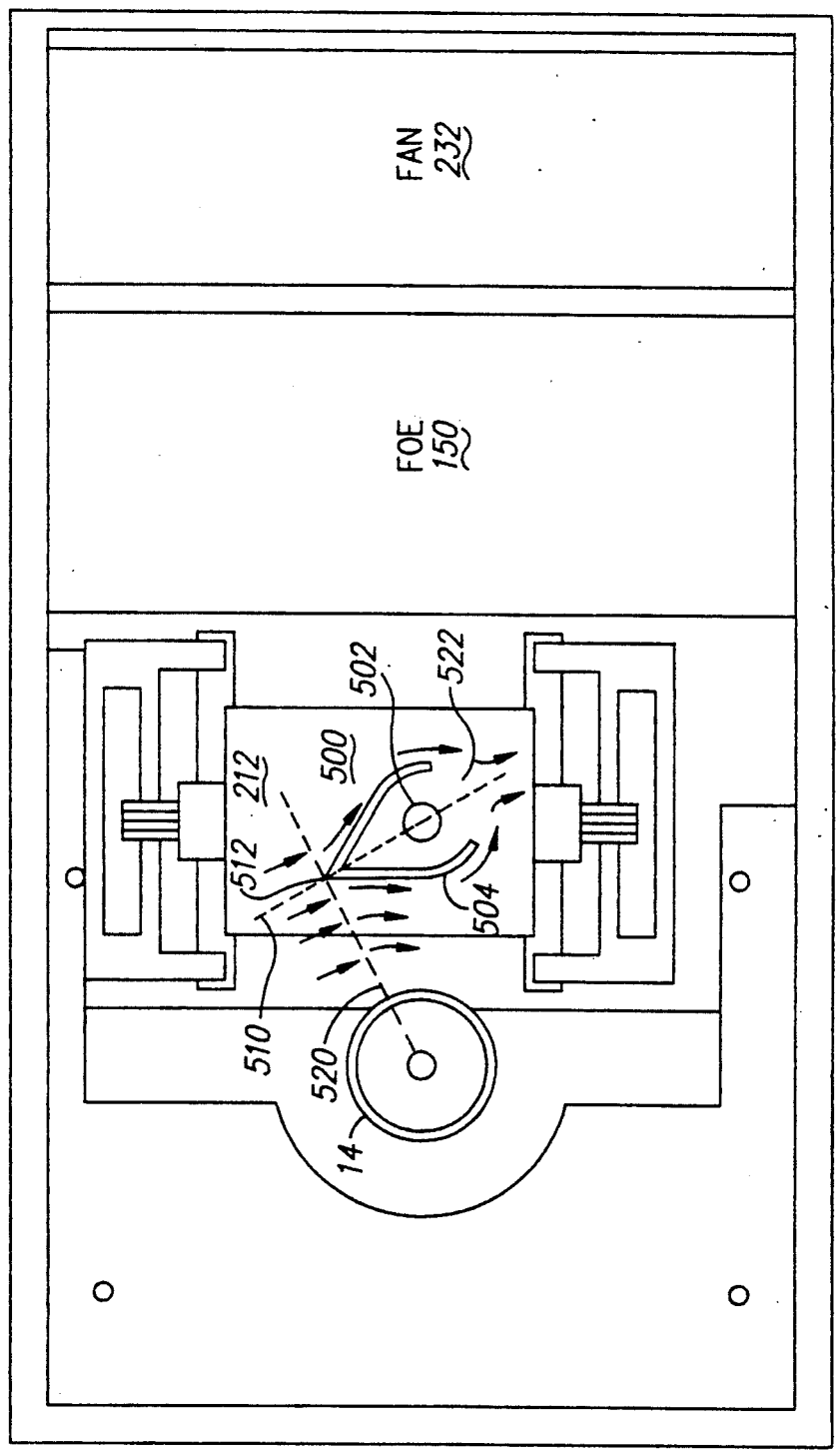
FIG. 7 shows a cross-sectional top view of the drive of FIG. 1 with an airfoil.

FIG. 7 shows a cross-sectional top view similar to FIG. 4, except that the airfoil 212 is now shown. Airfoil 212 comprises a plate member 500 which is attached to the top of posts 340 of optical head 20 by cement or other suitable attachment. Plate 500 is preferably sized to cover the entire top of the optical head 20 such that the optical head 20 is screened from the open slot 410 of cartridge 400. Plate 500 may be made of any suitable material, however, a low mass material such as plastic or aluminum is preferred. It is desirable to keep the mass of the optical head to a minimum in order to insure fast access times. Although the plate 500 covers the entire top of the optical head 20 in the preferred embodiments, this low mass requirement may necessitate a smaller plate 500 in some situations.

Plate 500 has a lens aperture 502 which is positioned directly over lens 62. An airflow screening member 504 (also known as an airflow diverting member) extends a distance above plate 500 and substantially surrounds lens aperture 502. In a preferred embodiment member 504 is a ridge. The top of ridge 504 is positioned a distance above the top surface of lens 62 between the top surface of lens 62 and the disk 12. Ridge 504 is symmetical about an axis 510 which passes through the center of aperture 502. Ridge 504 has an acute angled leading edge 512 along axis 510. An axis 520 extends radially from the center of spindle motor 14 to edge 512. The axes 510 and 520 are approximately perpendicular with respect to one another. Ridge 504 has a gap 522 located on axis 510 on the leeward side or opposite side of aperture 502 as edge 512. Plate 500 and ridge 504 may preferably be covered with a protective coating such as fluro-carbon. This coating may be useful in protecting the optical disk 12 from impact with the ridge 504 in the event there is a severe external shock to the drive.

In operation, disk 12 spins in a clockwise direction from the perspective shown in FIG. 4. This causes an airflow as shown by the arrows. Ridge 504 diverts the airflow away from the lens aperture 502 such that particles do not hit and adhere to lens 62. The ridge 504 is designed to maintain a laminar airflow around aperture 502. There are no turbulent areas which tend to collect particles. Gap 522 prevents a negative pressure region from developing inside ridge 504. Such a negative pressure region may tend to collect particles.

Figure 8:
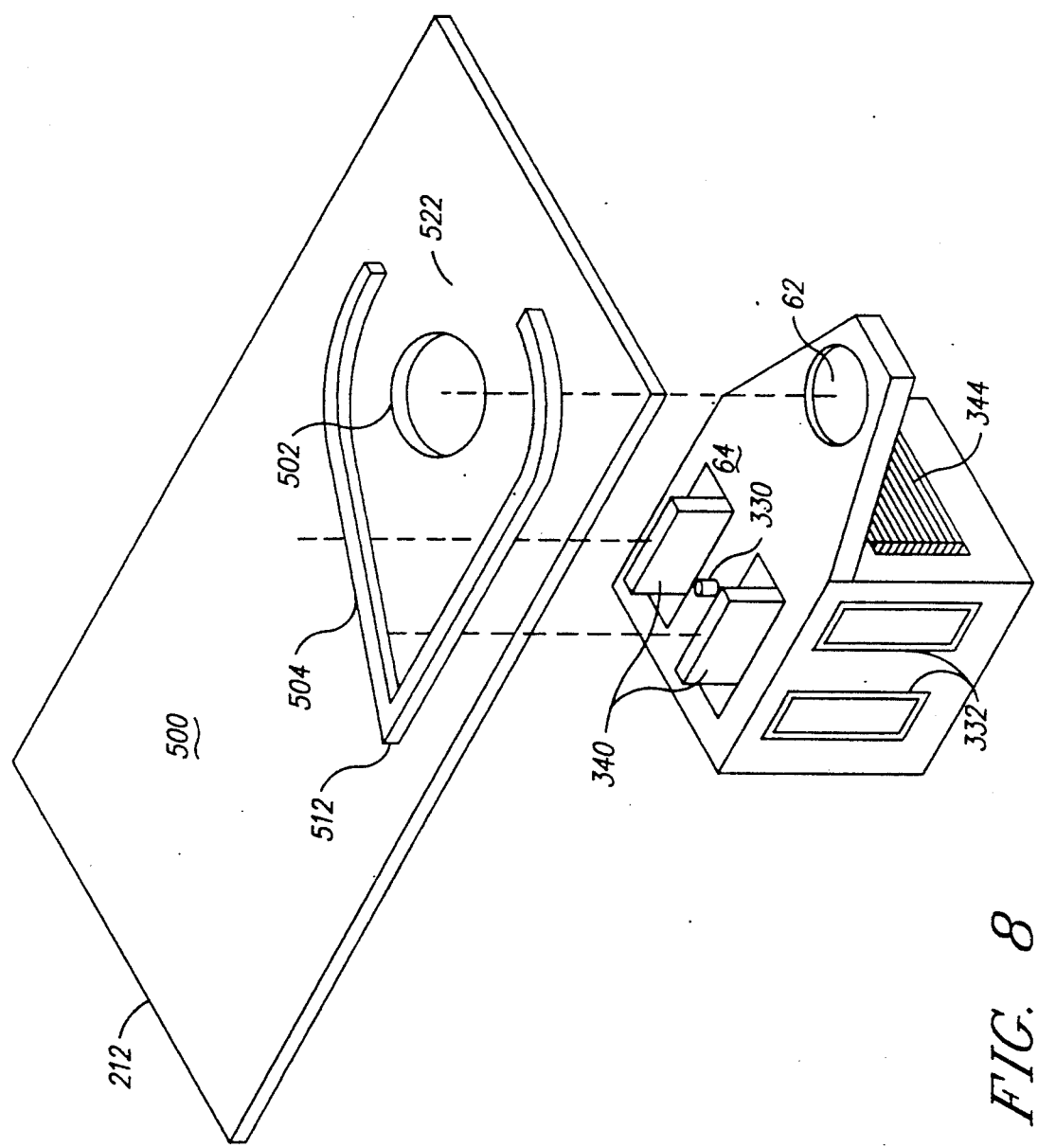
FIG. 8 shows a perspective view of the airfoil and optical head of FIG. 7.

FIG. 8 shows a detailed perspective view of lens holder 64 and airfoil 212. Note that airfoil 212 is attached to the top surface posts 340. Posts 340 are of sufficient height such that the airfoil 212 does not interfere with vertical movement of holder 64.

Figure 9A:
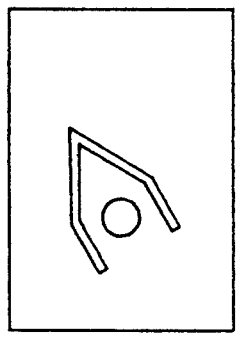
FIGS. 9A, B, C, D and E show top views of various alternative embodiments of the airfoil.
Figure 9B:
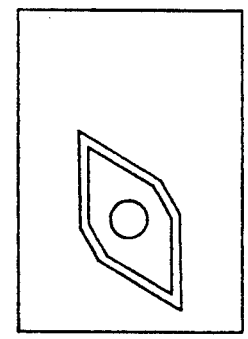
Figure 9C:
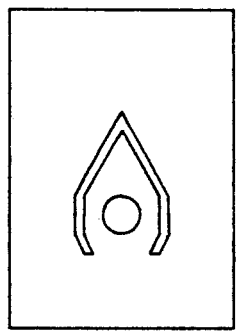
Figure 9D:
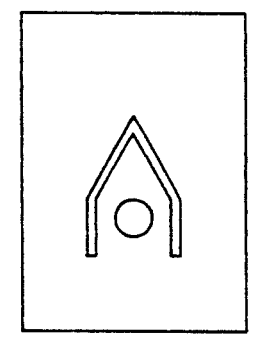
Figure 9E:
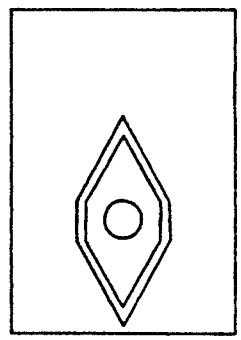

FIGS. 9A, B, C, D and E show top views of various alternative embodiments of the airfoil. Numerous other configurations of the airfoil are also possible. The important feature is that the airflow screening member be located toward the windward side of the lens such that the lens is screened from the airflow. Preferably the member extends around the lens and is shaped such that a laminar airflow is achieved.

Figure 10A:
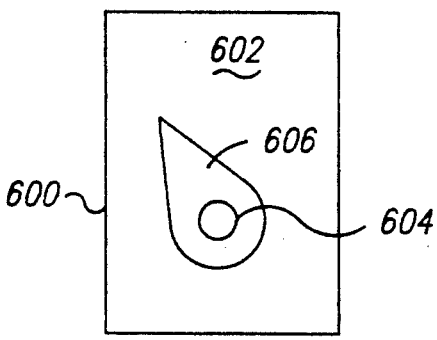
FIGS. 10A and B show a top and side view respectively, of an alternative embodiment of the airfoil.
Figure 10B:
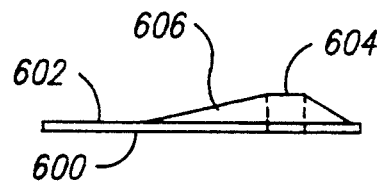

FIG. 10A and 10B show a top view and side view, respectively, of an additonal alternative embodiment of the airfoil of the present invention and is designated by the general reference number 600. Airfoil 600 has a plate 602 with a lens aperture 604. Here the screening member is an airfoil surface 606 which extends above plate 602 and surrounds aperture 604. Surface 606 directs the flow of air above aperture 604 in a laminar manner such that there is no turbulence.

Figure 11:
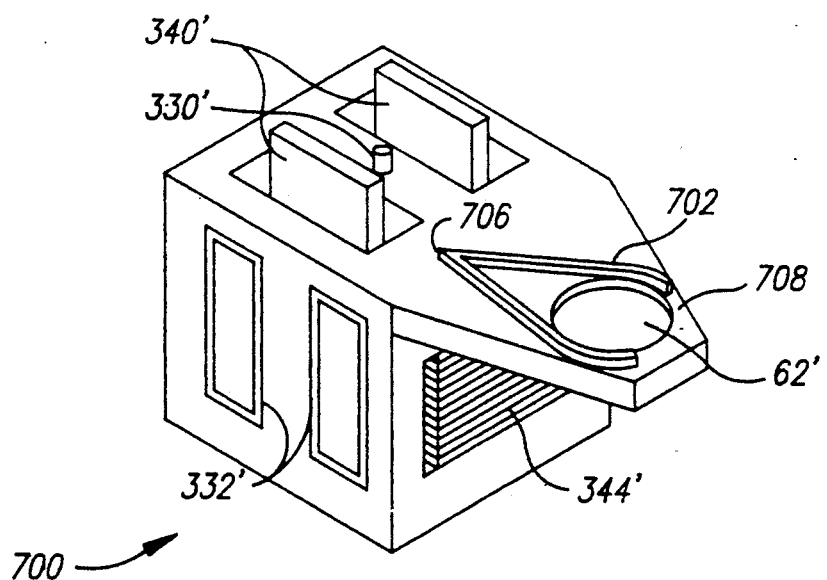
FIG. 11 shows a perspective view of an alternative embodiment of the airfoil and the optical head.

FIG. 11 shows a perspective view of an alternative embodiment of the lens holder 64 and is designated by the general reference number 700. Elements of holder 700 which are similar to holder 64 are designated by a prime number. The upper surface of holder 700 has an integral airflow screening member or ridge 702 which substantially surrounds lens 62'. Ridge 702 has an acute angled leading edge 706 and a rear gap 708 similar to that of airfoil 212.

In all of the embodiments, the screening member is preferably aerodynamic in shape such that the airflow is diverted away from the lens in a laminar manner. Numerous other shapes and configurations for the screening member are therefore possible.

Figure 12:
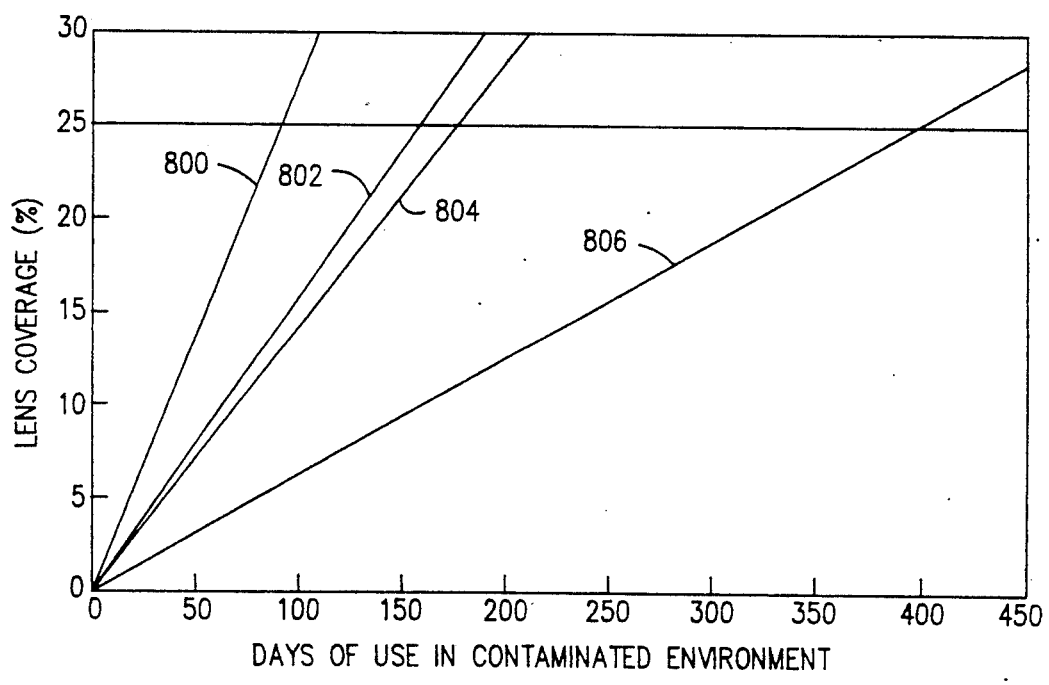
FIG. 12 shows a graph of lens coverage versus time.

FIG. 12 shows a graph of lens coverage versus time in a contaminated environment. The inventors have determined that when the objective lens of an optical disk drive becomes covered by particles over approximately 20–25% of its surface, the signal to noise ratio of the drive is degraded to the point that the drive will no longer function. The graphs are based on experimental data and illustrate the estimated lifetimes for the drives. A line 800 represents the lens coverage for a prior art optical disk drive.

A line 802 represents the lens coverage of the system 10 having the door 222 and the sealing member 360, but not the airfoil 212. A line 804 represents the lens coverage of system 10 with the airfoil 212, but without the aperture door 222 and sealing member 360. A line 806 represents the system 10 having the door 222, the sealing member 360 and the airfoil 212. As can be seen, the present invention greatly slows the particle build up on the lens and extends the life time of the optical drive by a factor of 4 to 5.

The present invention has been described in connection with a magneto-optic rewriteable optical disk drive. However, the present invention could also be used with any other type of optical disk drive including read only memory (ROM), compact disk (CD), write once read many (WORM), or different types of rewriteable optical drives.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An optical data storage system comprising:
    a means for receiving an optical data storage disk;
    a means for rotating the optical data storage disk;
    an optical means for accessing data from the optical data storage disk; and
    an airflow means located between the optical means and the rotating disk for diverting an airflow generated by the rotating disk away from the optical means.

2. The system of claim 1, wherein the airflow means comprises a plate having an aperture located over an objective lens of the optical means, and a screening member located between the aperture and the airflow.

3. The system of claim 2, wherein the screening member is a ridge.

4. The system of claim 3, wherein the ridge is substantially diamond shaped.

5. The system of claim 3, wherein the ridge has an acute angled edge which is oriented to receive the airflow.

6. The system of claim 2, wherein the screening member comprises a surface extending above the plate and substantially surrounding the aperture.

7. The system of claim 2, wherein the screening member substantially surrounds the aperture.

8. The system of claim 7, wherein the screening member has a gap on the leeward side of the aperture.

9. The system of claim 1, wherein the airflow means comprises an aerodynamic shaped member.

10. An optical data storage system comprising:
    a means for receiving an optical data storage disk;
    a means for rotating the optical data storage disk;
    an optical head in optical communication with the disk for accessing data from the disk;
    a movement means connected to the optical head for moving the head in a radial direction relative to the disk; and
    an airflow means connected to the optical head between the optical head and the rotating disk for diverting an airflow generated by the rotating disk away from the optical head.

11. The system of claim 10, wherein the airflow means comprises a plate having a surface approximately parallel to the surface of the disk, the plate having an aperture located between an objective lens of the optical head and the disk, the plate having a screening member located between the aperture and the airflow.

12. The system of claim 11, wherein the screening member is a ridge.

13. The system of claim 12, wherein the ridge is substantially diamond shaped.

14. The system of claim 12, wherein the ridge has an acute angled edge which is oriented to receive the airflow.

15. The system of claim 11, wherein the screening member comprises a surface extending above the plate and substantially surrounding the aperture.

16. The system of claim 11, wherein the screening member substantially surrounds the aperture.

17. The system of claim 16, wherein the screening member has a gap on the leeward side of the aperture.

18. The system of claim 10, wherein the airflow means comprises a screening member located on a surface of the optical head proximate an objective lens of the optical head.

19. The system of claim 10, wherein the airflow means comprises an aerodynamic shaped member.

20. An optical data storage system comprising:
    a means for receiving an optical data storage disk;
    a means for rotating the optical data storage disk;
    a radiation generation means for producing a radiation beam;

a radiation transmission means for transmitting the radiation beam to the disk, the transmission means including an optical head with an objective lens for focussing the radiation beam to the disk, a first movement means for moving the optical head in a radial direction relative to the disk, and a second movement means for moving the objective lens in a direction perpendicular to the surface of the disk;

an airflow means located between the objective lens and the disk for diverting an airflow generated by the rotating disk away from the objective lens; and a radiation reception means for receiving a reflected radiation beam from the disk and generating a data signal responsive thereto.

21. The system of claim 20, wherein the airflow means is attached to the optical head.

22. The system of claim 20, wherein the airflow means is attached to the second movement means.

23. The system of claim 20, wherein the airflow means comprises a plate having an aperture located over the objective lens, and a screening member located between the aperture and the airflow.

24. The system of claim 23, wherein the screening member is a ridge.

25. The system of claim 24, wherein the ridge is substantially diamond shaped.

26. The system of claim 24, wherein the ridge has an acute angled edge which is oriented to receive the airflow.

27. The system of claim 23, wherein the screening member comprises a surface extending above the plate and substantially surrounding the aperture.

28. The system of claim 23, wherein the screening member substantially surrounds the aperture.

29. The system of claim 28, wherein the screening member has a gap on the leeward side of the aperture.

30. The system of claim 20, wherein the airflow means comprises an aerodynamic shaped member.

* * * * *

UNITED STATES PATENT AND TRADEMARK OFFICE
CERTIFICATE OF CORRECTION

PATENT NO. : 5,200,945
DATED : April 6, 1993
INVENTOR(S) : Edward M. Engler, et. al.

It is certified that error appears in the above-indentified patent and that said Letters Patent is hereby corrected as shown below:

On the Title page, item [54], in the Title, and col. 1, line 2, delete the word "DEFECTING" and add --DEFLECTING--.

Signed and Sealed this

Twenty-first Day of December, 1993

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,200,945

DATED : April 6, 1993

INVENTOR(S) : Edward M. Engler, Stephen L. Heesacker, David Holmstrom, Bryon Lee.

It is certified that error appears in the above-identified patent and that said Letters Patent is hereby corrected as shown below:

Column 5, Line 7, between pair and magnets, insert the word --of--

Signed and Sealed this

Twenty-fifth Day of January, 1994

Attest:

BRUCE LEHMAN

Attesting Officer   Commissioner of Patents and Trademarks